(No Model.)

B. HALL.
CORRUGATING MACHINE.

No. 505,600. Patented Sept. 26, 1893.

WITNESSES
Frank G. Parker
Eva A. Guild

INVENTOR
Bicknell Hall
by Geo. O. G. Coale
his Attorney

United States Patent Office.

BICKNELL HALL, OF TAUNTON, ASSIGNOR TO THE WAINWRIGHT MANUFACTURING COMPANY OF MASSACHUSETTS, OF BOSTON, MASSACHUSETTS.

CORRUGATING-MACHINE.

SPECIFICATION forming part of Letters Patent No. 505,600, dated September 26, 1893.

Application filed October 29, 1891. Serial No. 410,255. (No model.)

*To all whom it may concern:*

Be it known that I, BICKNELL HALL, of Taunton, in the county of Bristol and State of Massachusetts, have invented certain new and useful Improvements in Corrugating-Machines, of which the following is a specification.

My invention relates to the class of corrugating machines shown in Letters Patent of the United States No. 434,060, granted August 12, 1890, to Hanson and Wainwright. That patent shows a machine for forming spiral corrugations in metal tubes, but no provision is made for forming corrugations of other form than the spiral corrugations shown and described therein.

The object of my invention is to provide a machine for forming either spiral corrugations, or separate and distinct parallel annular corrugations in the tube, and I provide a corrugating tool consisting of a cylinder of steel or other suitable material, in which is formed a spiral corrugation to form a spiral rib of uniform diameter extending two or more times around the surface of the cylinder, and I adjust the tool or cylinder to cause the axis of the spirals to assume different angles relatively to the axis of the tube to be corrugated. When in a certain position a spiral corrugation will be formed in the tube, when in another position, parallel independent, annular corrugations will be formed.

Figure 1:
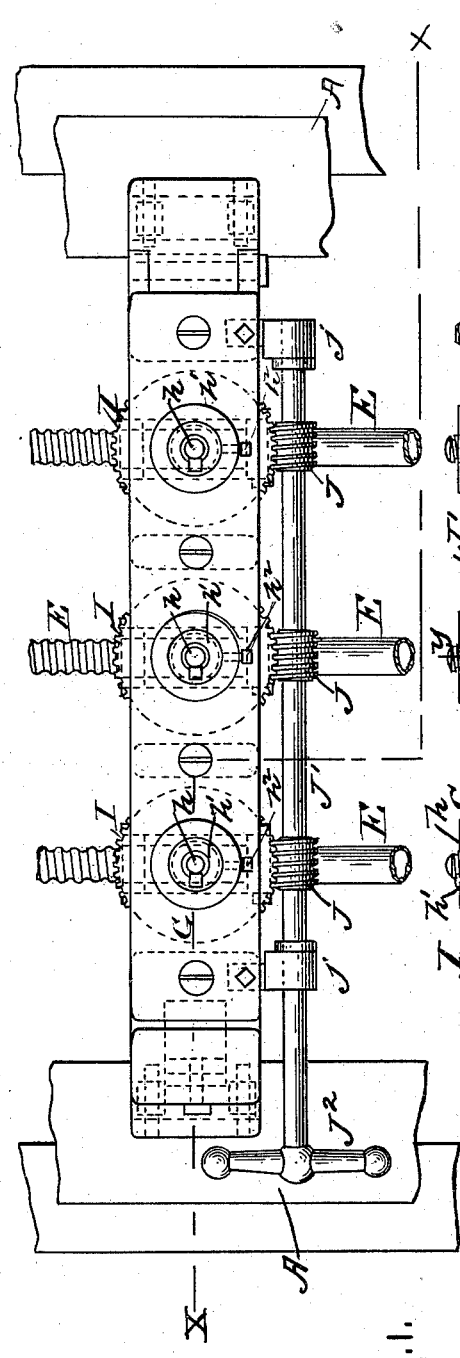
Figure 2:
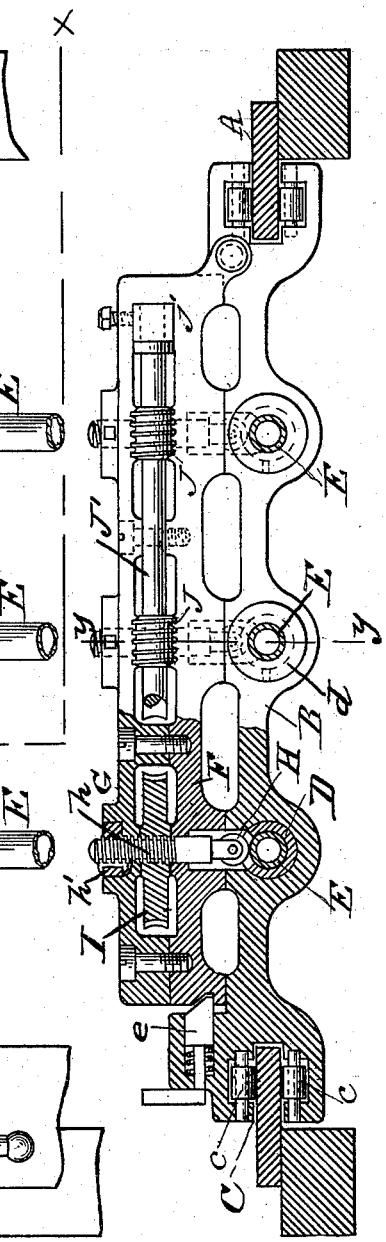
Figure 5:
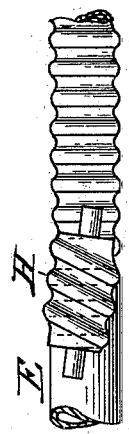
Figure 3:
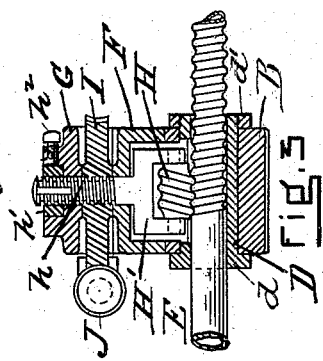
Figure 4:
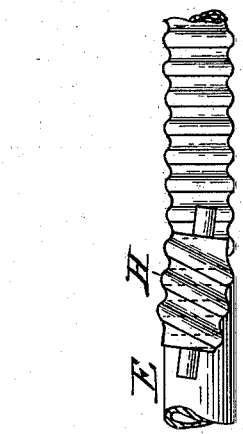

In the accompanying drawings illustrating my invention, Figure 1 is a plan view of a portion of a corrugating machine embodying my improvements. Fig. 2 is a view partly in end elevation and partly in section of the same, on the line X—X, of Fig. 1. Fig. 3 is a transverse section on the line y—y of Fig. 2. Fig. 4 is a detail view showing a portion of a tube spirally corrugated and a corrugating tool arranged in position for forming a spiral corrugation. Fig. 5 is a similar view of a tube formed with parallel independent annular corrugations, and a tool set to form such corrugations.

The carriage bed B, is provided with a groove at each end C, and with friction rolls c, which run on the ways A. The carriage shown in the drawings is adapted to employ three tools, each corrugating its own piece of tubing E, and for this purpose the bed is provided with sleeves D, which set into the bed of the carriage and which are slotted on one side sufficiently to allow the tool to project inwardly in the manner indicated in Figs. 2 and 3. The sleeve keeps the tube true while it is being corrugated, and it has a flange $d$ at one end, its other end being threaded and provided with a nut $d'$. Any suitable means may be employed for rotating the tubes.

The carriage cover is made in two parts F and G, which are secured together by screws, as shown, the cover being hinged for convenience to the carriage bed and latched by the detent $e$. Each tool H, is journaled in a tool holder H', which is provided with a threaded shank $h$, passing up through the carriage cover and keyed into a collar $h'$. A gear I, threaded to feed the shank is secured thereto and is turned by the worm J, which is mounted on a shaft J' provided with a handle $J^2$. The shaft is journaled in boxes $j$ attached to the part G of the carriage cover. The gears I, may be turned by operating the handle $J^2$. The shank $h$, of the tool holder is prevented from rotating by the collar $h'$, to which it is keyed, and the set screw $h^3$ which bears upon this collar. Any rotation of the gear I, will feed the tool either in or out of the sleeve D. By loosening the set screw $h^2$ and turning the shank of the tool holder in either direction, the angle of the axis of the tool relatively to the axis of the tube may be varied.

The set screw $h^2$ may be tightened to hold the tool holder in its adjusted position.

The corrugating tool proper is of general cylindrical form, and is provided with a spiral corrugation extending two or more times around it of a pitch, say of four threads to the inch. A spiral rib of two or more complete turns and of uniform diameter or radius is thus formed on the cylinder and effects the corrugation of the tube as hereinafter explained. By setting a tool of this kind with its axis at a proper angle to the axis of the tube to be corrugated, a spiral thread is made as indicated in Fig. 4. If the thread of the tool be right-handed and the tool be set in such manner that the line or lines of contact between the tool and the tube are at right angles, to the axis of the tool, or in other words, set in such manner that the axis of the tool is at a proper angle with the axis of the tube, annular corrugations will be formed in the tube, as indicated in Fig. 5. If the tool be turned from the position shown in Fig. 5, until its axis is at a greater angle to the axis of the tube than that shown, a left-handed corrugation will be made. In each case there must never be less than two firm points of contact between the tool and the tube, as the regular feed of the carriage is necessary to the proper corrugation of the tube.

I claim as my invention—

1. A tube corrugating machine comprising a holder for the tube to be corrugated, a corrugating roll having a spirally arranged rib with two or more complete turns extending around its circumference, and a tool holder adjustable to vary the angle of the axis of the tool relatively to the axis of the tube, whereby either a continuous spiral corrugation or a series of separate and distinct annular corrugations may be formed in the tube.

2. A tube corrugating machine comprising a holder for the tube to be corrugated, a corrugating roll having a spirally arranged rib with two or more complete turns extending around its circumference and extending around its diameter, and a tool holder adjustable to vary the angle of the axis of the tool relatively to the axis of the tube and located in proximity to the tube holder, in which the corrugating roll has its bearings, all as set forth.

3. A tube corrugating machine comprising a holder for the tube to be corrugated, a corrugating roll having a spirally arranged rib with two or more complete turns extending around its circumference and all of uniform diameter, and a tool holder comprising bearings for the corrugating roll, and a shank or pivot adapted to vary the angle of the axis of the tool to the angle of the axis of the tube carried by an arm adjustable toward and from the holder, all as set forth.

In testimony whereof I have hereunto subscribed my name this 13th day of October, A. D. 1891.

BICKNELL HALL.

Witnesses:
GEORGE O. G. COALE,
EVA A. GUILD.

Correction in Letters Patent No. 505,600.

It is hereby certified that the name of the assignee in Letters Patent No. 505,600, granted September 26, 1893, upon the application of Bicknell Hall, of Taunton, Massachusetts, for an improvement in "Corrugating Machines," was erroneously written in the grant "The Wainwright Manufacturing Company," whereas said name should have been written *The Wainwright Manufacturing Company of Massachusetts;* and that the said Letters Patent should be read with this correction therein that the same may conform to the record of the case in the Patent Office.

Signed, countersigned, and sealed this 3d day of October, A. D. 1893.

[SEAL.]

WM. H. SIMS,
*First Assistant Secretary of the Interior.*

Countersigned:

S. T. FISHER,
*Acting Commissioner of Patents.*